United States Patent
Su

[11] Patent Number: 5,901,642
[45] Date of Patent: May 11, 1999

[54] HIGH EFFICIENCY FUEL-SAVING DRAWER-TYPE STEAM CABINET

[76] Inventor: Hui-Hsiung Su, No. 907-11, Chi-Nan Rd., Kaohsiung City, Taiwan

[21] Appl. No.: 09/110,156

[22] Filed: Jul. 6, 1998

[51] Int. Cl.$^6$ .............................. A47J 27/04; A47J 27/12; A47J 43/24; F24D 1/00
[52] U.S. Cl. ................................ 99/417; 99/473; 99/483; 126/20; 126/369
[58] Field of Search .............................. 99/483, 416, 467, 99/417, 473–476, 352, 403, 485, 516, 534, 410; 126/369, 369.2, 20.1, 20; 219/388, 401, 400; 426/510, 511, 523

[56] References Cited

U.S. PATENT DOCUMENTS

| | | | |
|---|---|---|---|
| 702,597 | 6/1902 | Salmon | 99/288 |
| 4,202,259 | 5/1980 | Johanssson | 99/352 |
| 4,426,923 | 1/1984 | Ohata | 99/474 X |
| 4,436,082 | 3/1984 | Hiller et al. | 126/20 X |
| 4,655,192 | 4/1987 | Jovanovic | 126/20 |
| 4,674,402 | 6/1987 | Raufeisen | 99/276 X |
| 4,839,502 | 6/1989 | Swanson et al. | 219/401 |
| 5,203,258 | 4/1993 | Tippmann et al. | 99/483 |
| 5,235,903 | 8/1993 | Tippmann | 126/369 X |
| 5,517,980 | 5/1996 | Cappello et al. | 126/20 |
| 5,601,013 | 2/1997 | Larsson et al. | 99/476 |
| 5,617,839 | 4/1997 | Jennings et al. | 99/474 X |
| 5,680,810 | 10/1997 | Sham | 99/330 |

*Primary Examiner*—Timothy F. Simone
*Attorney, Agent, or Firm*—Bacon & Thomas

[57] ABSTRACT

A high efficiency fuel-saving drawer type steam cabinet includes multiple layers provided at the front of the housing for accommodating steam bins. The front panels of each of the steam bins includes inclined or slanting planar surfaces at respective inner sides of the upper, lower, left and right edges. Provided at the front end of both sides of the cabinet housing are several laterally extending joists each made up of an upper frame board and a lower frame board that also form inclined planar surfaces. The inclined surfaces on the upper and lower frame boards are respectively angled to engage and achieve air tight contact with the upper and lower inclined surfaces on the front panels of adjacent steam bins. In addition, an inclined side panel having an inwardly slanting or inclined surface is provided on both side walls of the cabinet housing to engage the two inclined side surfaces of the front panels and form an air tight seal therewith. A water storage passage and an air exhaust passage are provided in the rear of the cabinet housing for effectively reclaiming exhaust from the heating fuel to heat up the water used to generate the steam.

2 Claims, 5 Drawing Sheets

HIGH EFFICIENCY FUEL-SAVING DRAWER-TYPE STEAM CABINET

BACKGROUND OF THE INVENTION:

The present invention relates to a high efficiency fuel-saving drawer type steam cabinet, and more particularly to a steam cabinet exclusively designed for steaming and keeping warm various types of soup.

The steam cabinets available in the market are essentially divided into two types. In the first type of cabinet, which is for steaming stuffed buns, dumplings and similar edibles, a door is provided at the front panel to provide access for placing food in and removing the food when opened, and for sealing the cabinet housing when shut, so to keep the steam from escaping, as disclosed in another utility model application pending (Application No. 78210395) by this same applicant. The second type is for steaming soups generally seen in snack shops. Within such a cabinet, multiple drawer segregation layers are provided, each layer accommodating a drawer bin with dishes or cups to be placed above the bin. Each bin can be separately pulled out when the soup desired is ordered.

By referring to FIG. 1, a hollow chamber is provided inside a drawer type steam cabinet housing (1) of the prior art, and multiple rails are relatively provided on the upper and lower edges of inner walls on both sides of the chamber to form several separation layers or compartments for drawers (11). A drawer bin (12) for holding soup dishes (13) to be steamed can be inserted into each layered compartment, a pot (2) containing boiling water is provided below the steam cabinet, and a heating oven fixture (3) is placed below the pot (2). Steam generated by the water in the pot (2) when heated by the oven fixture (3) passes through pores distributed on the bottom of the bin (12) of each layer, and gradually rises up to cause food in the dishes (13) to cook and keep warm the food.

The prior art has the following defects:

1. It has poor steaming effects and usually serves at best to keep the food warm because, when the bin is placed inside the housing (1), there is a gap between the open end of the housing (1) and the bin (12), so that the steam still manages to escape from each drawer layer, thus preventing the temperature in the bins from rising to 100° C. (generally staying between the range of 80° C.~90° C.). As a result, steaming usually takes a longer time and soup must be boiled before being put into the cabinet for keeping warm. In practice, the conventional drawer-type steam cabinet does not provide the function of steaming the food.

2. The fire from the oven fixture (3) provides low heating efficiency for the pot (2), that is, part of the hot air and the waste gas discharged from heating the pot (2) by such fire is not reclaimed, resulting in a great waste of fuel energy.

3. The prior art cabinet requires attention to refilling of water to the pot (2). When the water in the pot (2) is about to be used up, the pot (2) has to be removed for the refill. Such a process presents hazards of being burned by boiling water for the operator, making the water refill an inconvenient operation.

Despite having been provided with multiple drawer layers for accommodating several steam bins to steam (or actually keep warm) various types of soup dishes, the absence of a good air-tight contact between the bins, and between the front end of the steam bins and the opening of the housing of the prior art cabinet, prevents real steaming effects of the type obtained by a door type of steam cabinet. Therefore, there is a need for a drawer type steam cabinet that provides air-tight separation for each layer of drawer type steam bins, and effective reclaiming of fuel waste gas to promote the energy consumption.

SUMMARY OF THE INVENTION

The primary purpose of the present invention is to provide a high efficiency fuel saving drawer type steam cabinet by providing folded plates, each with an inclined or slanting plane at the periphery of the front end of the drawer bin and, at both side inner walls of the cabinet housing corresponding to the folded plates, joists having a "<" shaped slanting plane to give both effective steaming and to keep food warm. Furthermore, the chamber inside the cabinet housing corresponding to a water tank and an oven fixture are respectively connected through a water storage passage and an air exhaust passage. The air exhaust passage functions as a passage for the waste gas from combustion and the thermal energy from the waste gas is reclaimed to help boil the water in the water storage passage. Consequently, energy consumption is effectively reduced.

Related structure and functions of the present invention will be apparent from the following description.

Figure 1:
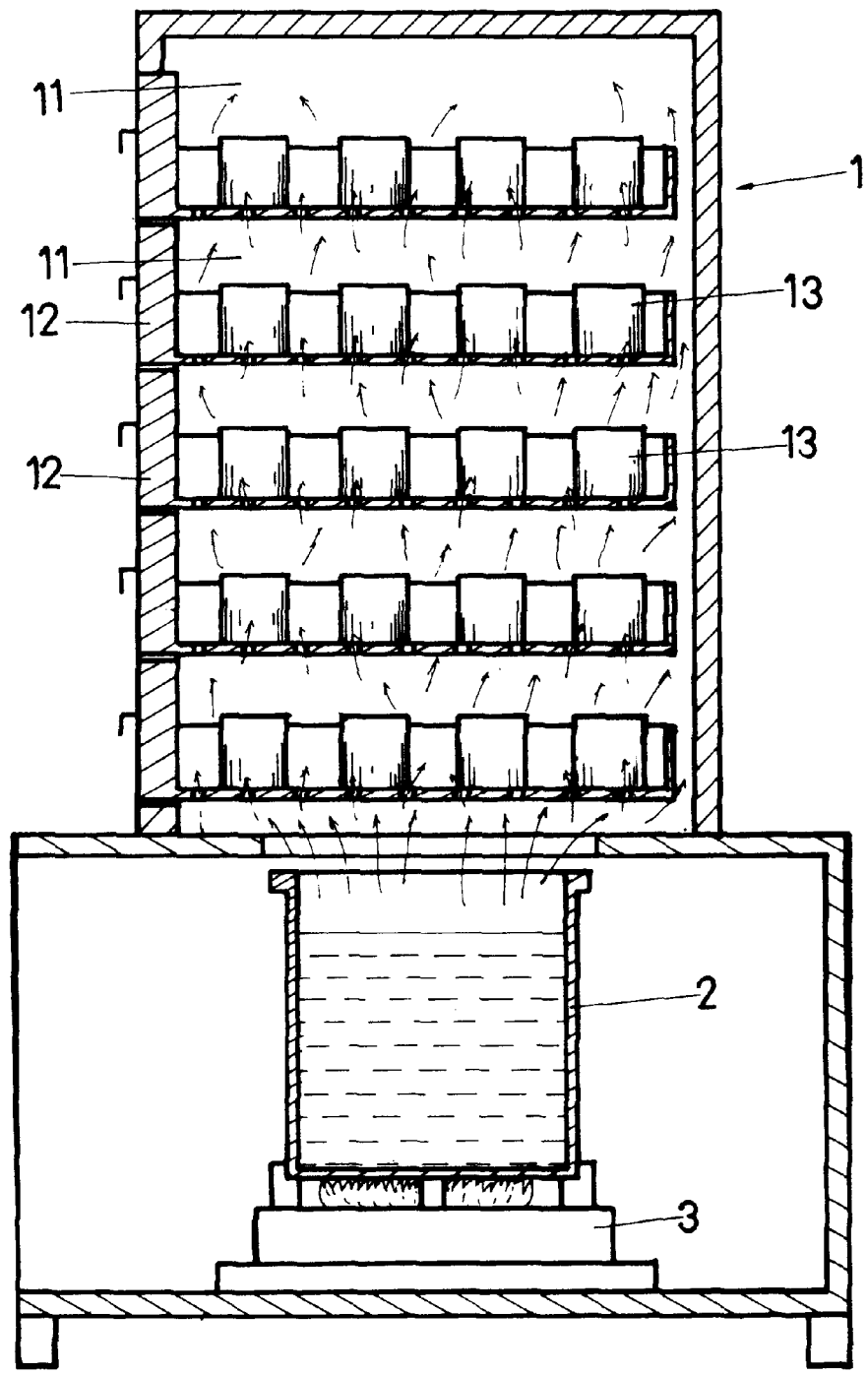
FIG. 1 is a view of the prior art drawer type steam cabinet.
Figure 2:
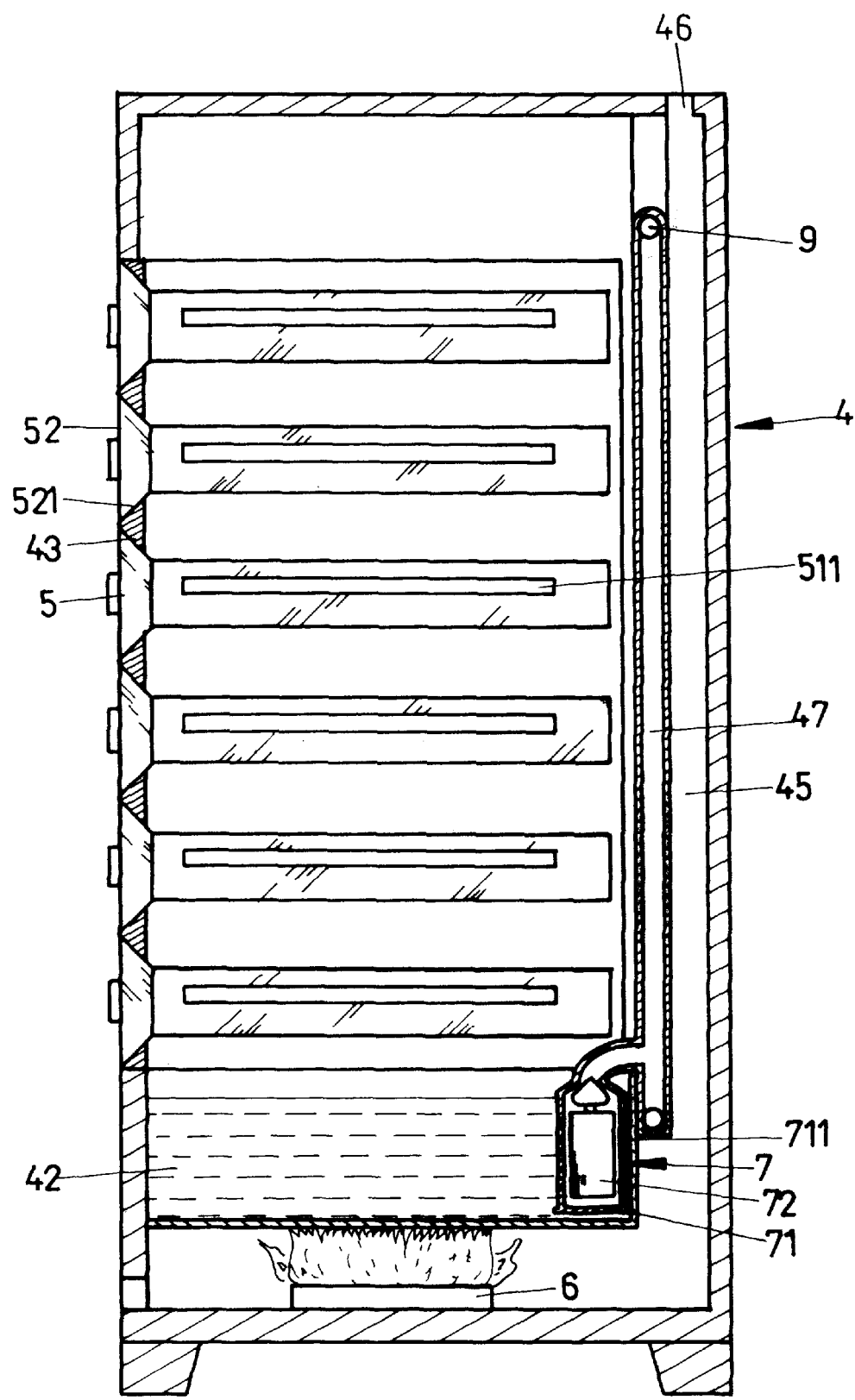
FIG. 2 is a vertical sectional view of a preferred embodiment of the present invention.
Figure 3:
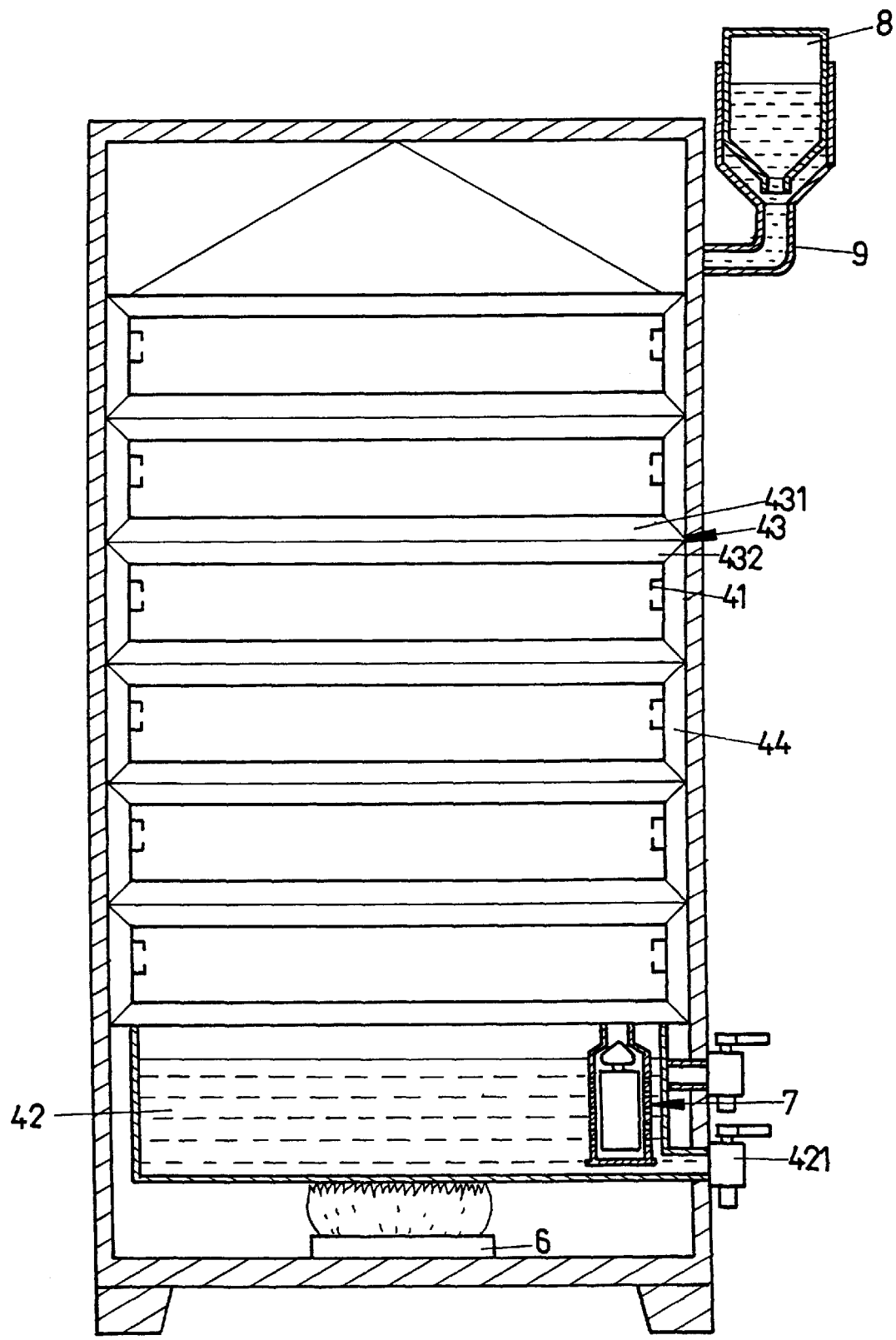
FIG. 3 is a view of a cabinet housing of the present invention.
Figure 4:
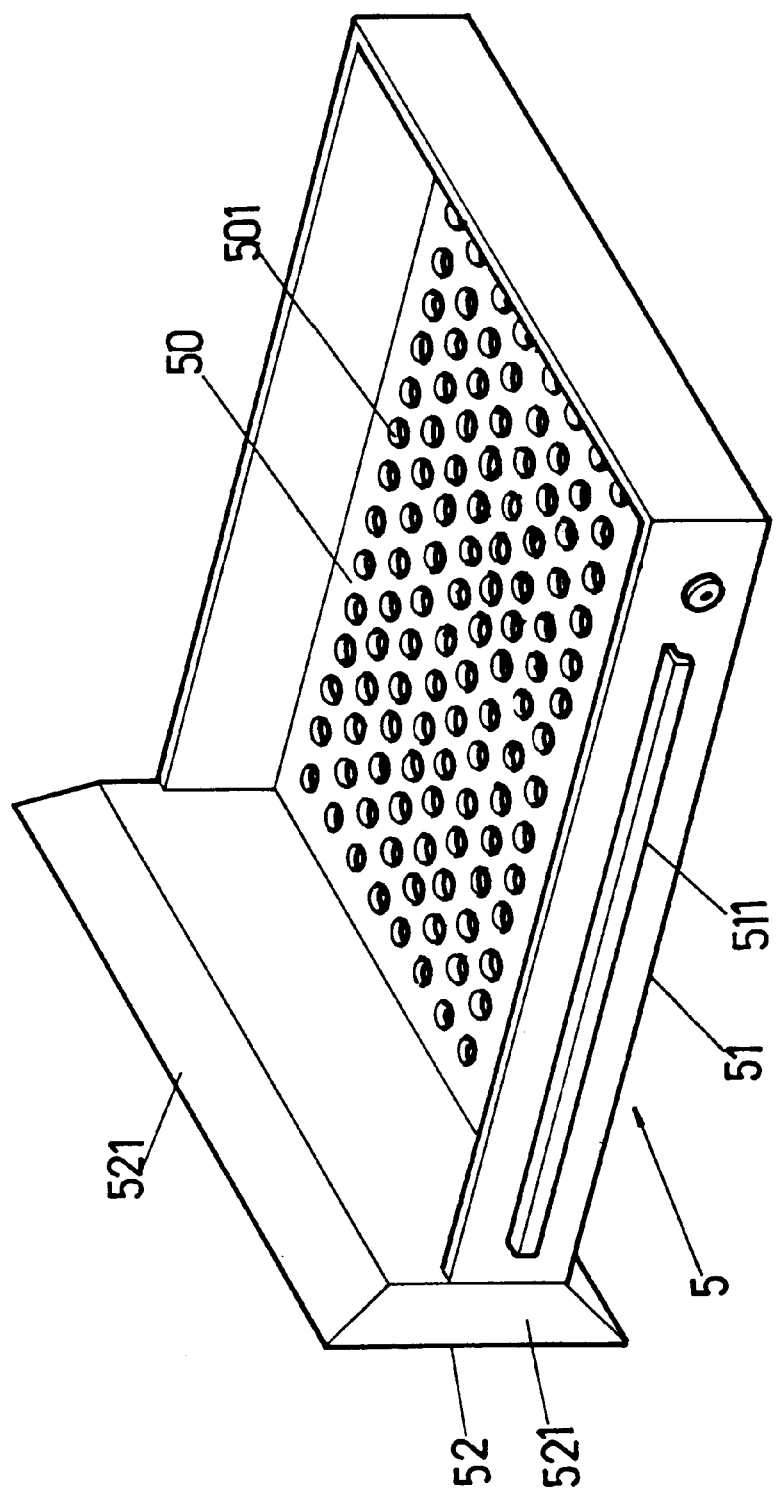
FIG. 4 is a view of a steam bin of a preferred embodiment of the present invention.

DETAILED DESCRIPTION OF THE INVENTION:

Referring to FIGS. 2 and 3, the present invention essentially includes a cabinet housing (4) and several steam bins (5). The cabinet housing (4) is a cabinet made of metal plates with an opening at the front and a chamber inside. A water tank (42) is provided at the bottom of the chamber and an external drainage valve is connected to the water tank (42). A space below the water tank is made available to accommodate an oven fixture (6), and multiple corresponding rails (41) are provided at the proper height and spacing on both sides of the inner wall of the cabinet housing (4). As illustrated in FIGS. 2 and 4, each steam bin (5) is a drawer type steam bin. Multiple pores (501) are distributed on an inner base plate (50) of the steam bin (5), and a guide rail (511) is provided at the proper location external to each side board (51) of the steam bin (5) so that, by cooperation of the guide rail (511) and a rail (41) of the cabinet housing (4), each steam bin (5) layer can be received by the chamber inside the cabinet housing (4), allowing sliding as desired.

Figure 5:
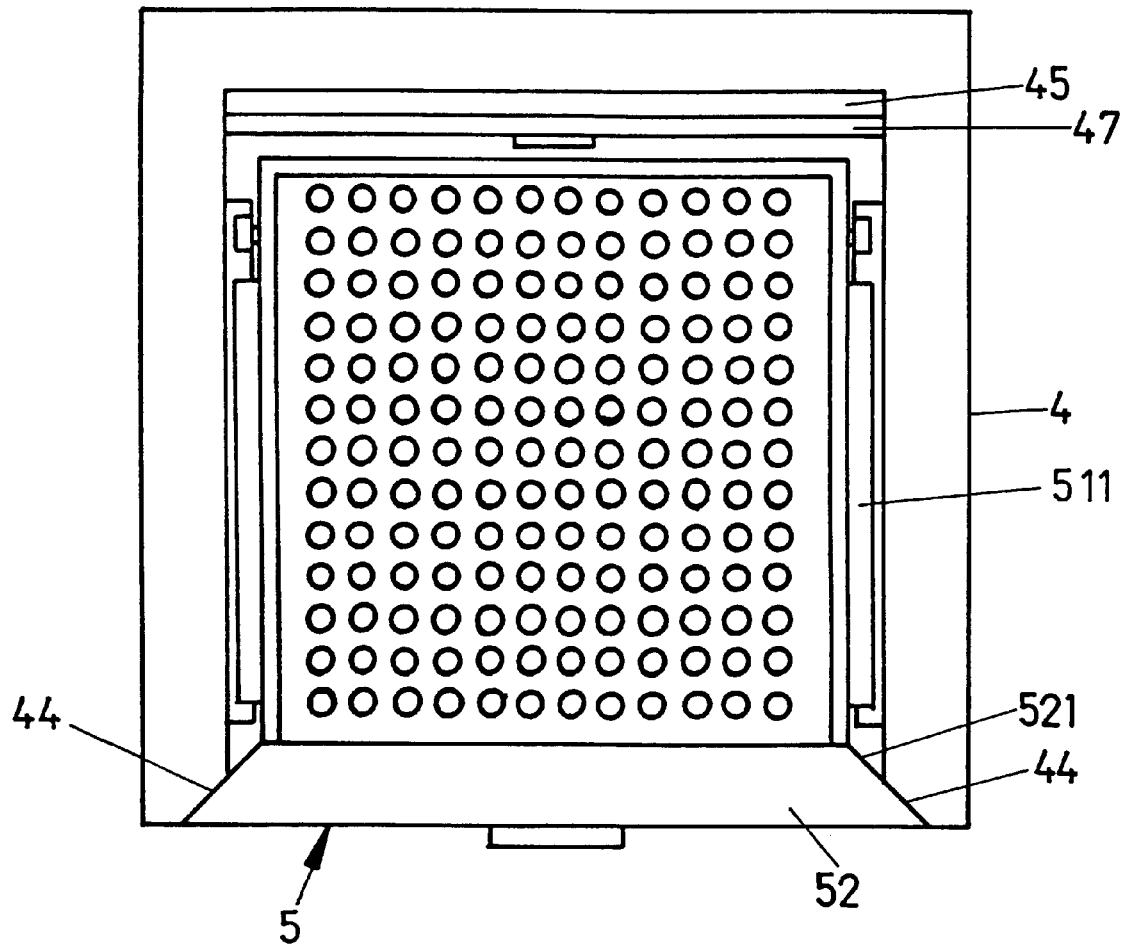
FIG. 5 is a cross sectional view of the preferred embodiment of the present invention.

Now referring to FIG. 4, the front panel (52) of each of the steam bins (5) of the present invention includes inclined or slanting planar surfaces at respective inner sides of the upper, lower, left and right edges of the front panel (52). As illustrated in FIG. 3, provided at the front end of both sides of cabinet housing (4), corresponding to the upper and lower sides of the front panel (52) of each said steam bin (5) are several laterally extending joists (43) each made up of an upper frame board (431) and a lower frame board (432) oriented in inclined planes. The inclined planes on the upper and lower frame boards (431) (432) are respectively angled to engage and achieve air tight contact with the upper and lower inclined surfaces (521) on the front panels (52) of adjacent steam bins (5). Furthermore, an inclined side panel (44) having an inwardly slanting or inclined surface is provided on both side walls of the cabinet housing (4). The inclined planes of the two inclined side panels (44) are respectively angled to engage the two inclined side surfaces (521) of the front panels (52) of steam bins (5) as illustrated in FIG. 5. As a result, when each steam bin (5) is placed into the cabinet housing (4), the opening at the front end of cabinet housing (4) becomes air tight upon receiving the steam bin (5), with the inclined surfaces (521) at the periphery of the front panels (52) contacting at the same angle the upper and lower frame boards (431) (432) of joists (43) and inclined panels (44) on both sides.

Referring to FIGS. 2 and 5, a water storage passage (47) and an air exhaust passage (45) are provided in sequence behind the chamber of cabinet housing (4). Air exhaust entresol (45) extends upward to reach an outlet (46) at the top of the steam cabinet and also extends downward to reach a space for accommodating the oven fixture at the bottom of the steam cabinet. Hot waste gas resulted from combustion in the oven fixture (6) is discharged from the outlet (46) at the top of the cabinet via the air exhaust passage. The water tank passage (47) on the inner side of the air exhaust passage (45) extends downward and is connected to the water tank (42), and also extends upward to near to the top of the steam cabinet. Therefore, the hot waste gas passing through the air exhaust passage (45) will help heat up the water in the water storage entresol (47) to reclaim the thermal energy from the hot waste gas.

In a preferred embodiment of the present invention, water tank (42) is heated by the combustion from the oven fixture (6) to generate exhalation, which then rises as steam and keeps warm the food on each steam bin (4) in the chamber. Meanwhile, the hot waste gas from the combustion in the oven fixture (6) during the process of discharge is transmitted to heat the water in the water storage passage (47) and reclaim thermal energy from the hot waste gas. Since inclined panel surfaces (521) at the periphery of the front panels (52) of steam bins (5) secure an air-tight closure with the front end opening of the cabinet housing, steam pressure inside the cabinet housing can rise up to a temperature over 100° C. (approximately in the range of 110° C.~120° C.) to steam and keep warm soup dishes placed on each drawer steam bin (5). Food in the soup dishes can be well steamed and kept warm for a longer period to fully utilize the efficiency in fuel consumption.

Furthermore, a buoy control valve (7) may be provided in the water tank (42). Buoy control valve (7) includes a buoy (72) inside a tube (71) provided with holes (711) in its outer circumference. The top of said tube (71) is connected to the bottom of the water storage passage (47). Water when heated in the water tank (42) will be gradually lost due to evaporation, but once the water level drops to a preset level, the buoy (72) in buoy control valve (7) will drop to allow reserve water to enter from the water storage passage (47) into the water tank (42). A pipeline (9) is connected at the top of said water storage passage (47) to reach outside the cabinet housing (4), and a bottle (8) is provided upsidedown at the top of said pipeline (9) so that when the water level in the water storage passage (47) drops, the water in the bottle (8) will automatically supply reserve water into the water storage passage (47). In the event a water shortage takes place in bottle (8), bottle (8) can be removed to fill it up. In addition, an additional control valve may be provided in the pipeline (9) below said bottle (8) to either stop or release the reserve water contained in the bottle (8). When the water level in said water tank (42) rises to the preset level, the buoy (72) in the buoy control valve (7) will shut off the water supply to automatically maintain water refill by the water tank (42) and the water storage passage (47).

The present invention gives the following advantages and effects:

1. It promotes thermal efficiency because the thermal energy carried by the hot waste gas is reclaimed by means of the water storage passage to help heat up the water tank (42) for energy saving purposes.

2. It offers convenient refill of water because thermal energy absorbed by the water storage passage can be used to heat up the water tank and enable automatic refill of reserve water.

3. It ensures steaming effects while keeping warm the food steamed (using a relative low fire for the oven fixture) because steam bins provided in the present invention allow the separate placement of various soup dishes and independent treatment depending on the type of soup to be served. By taking advantage of the air-tight closure between steam bins as well as between each bin and the cabinet housing (the closure is improved when the bin is pushed farther into the cabinet), the temperature of the steam is able to reach a level required by the steaming process while reducing energy consumption and requiring a shorter time for steaming process. Therefore, food on the steam bin can be well steamed whether the food is preheated or not.

I claim:

1. A high efficiency fuel-saving drawer type steam cabinet, comprising;
    a steam cabinet housing including a chamber divided at a front side into a plurality of separation layers, each layer arranged to receive one of a plurality of steam bins, said cabinet housing including front side walls having inclined side surfaces and a plurality of joists extending between the front side walls, said joists having upper and lower surfaces inclined away from each other;
    a water tank situated at a bottom of the chamber below said separation layers;
    wherein each of said steam bins includes a front panel having peripheral upper and lower inclined surfaces, and peripheral lateral inclined surfaces, respective upper and lower inclined surfaces of the front panels of adjacent bins being angled to engage respective inclined surfaces of one of the joists and respective lateral inclined surfaces of the front panels being angled to engage respective inclined side surfaces of the front side walls to form an airtight closure at the front of the cabinet housing to prevent escape of steam entering said bins when water in said water tank is heated to steam or keep warm food in said bins; and
    further comprising a water storage passage and an air exhaust passage provided behind the cabinet housing, wherein said water storage passage communicates with a space for receiving an oven fixture below said water tank so that hot waste gas generated from combustion of fuel in the oven fixture passes through the air exhaust passage to heat a reserve water supply for said water tank.

2. A steam cabinet as claimed in claim 1, wherein said water storage passage is connected to said water tank by a buoy control valve that opens when a water level in said tank drops below a predetermined level to automatically supply said water tank with water from said reserve water supply.

* * * * *